United States Patent Office 3,033,908
Patented May 8, 1962

3,033,908
PRODUCTION OF LEAD DIOXIDE
William G. Darland, Jr., Parma, Ohio, assignor to Union Carbide Corporation, a corporation of New York
No Drawing. Filed June 2, 1959, Ser. No. 817,450
3 Claims. (Cl. 136—27)

This invention relates to a new allotrope of lead dioxide and to a process for making the same.

Lead acid batteries have long been known to the art, wherein one electrode is elemental lead, and the other electrode is an inert conductor in electrical contact with lead dioxide; both electrodes being immersed in an acid electrolyte and usually having a mechanical separator to prevent inter-electrode shorting.

Aside from the familiar lead storage battery system, conventional lead-lead dioxide battery systems have frequently used positive electrodes made by electrodepositing lead dioxide on a chemically inert base material such as stainless steel, passivated steel, nickel, platinum, carbon, etc. Extensive literature references from as early as 1920 have mentioned the deposition of lead dioxide from aqueous solutions of lead nitrate, lead perchlorate, lead chelate, lead citrate, lead fluoborate, sodium plumbate, and lead sulfamate; and experimental evidence has shown that relative to lead, this lead dioxide identified as tetragonal or beta $PbO_2$ from these baths in a fluoboric acid electrolyte, yields a cell voltage of 1.74 volts at 75° F. when under current drains of from 50 to 55 ma./in.$^2$ and much lower cell voltage at very low temperatures. For certain applications it is now important that depolarizers show considerably less loss in voltage under drain at low temperatures, and it is quite desirable that the depolarizers provide as high voltage as possible.

Accordingly, it is the main object of the present invention to provide a more active allotrope of lead dioxide than has thus far been known.

A related object of the invention is to provide a practical process for producing such a material.

In the practice of the invention a base stock on which lead dioxide is to be deposited is made the anode of a plating cell, and an inert electrode is made the cathode. An aqueous solution of lead acetate, optionally with sodium nitrate or sodium acetate added to improve conductivity, serves as the salt bath. The bath is held between room temperature and 80° C. and current is passed between the anode and cathode to plate a lead compound on the anode. This lead compound produces a higher oxide of lead upon subsequent thermal treatment, which compound has increased potential when used as a cathode and as compared with the performance of conventional beta allotrope of lead dioxide.

The allotropic deposit of lead dioxide subject of this invention is produced by the following process. A solution of lead acetate is prepared by dissolving up to 400 gms./l. of lead acetate in water. If desired, up to 200 gms./l. of sodium nitrate or 225 gms./l. of sodium acetate may be added to increase bath conductivity. The bath is held at approximately room temperature for best results, but may be operated at temperatures up to 80° C. The base stock, on which the lead dioxide is to be deposited, is made the anode of the plating cell, and an inert (carbon or stainless steel) electrode is made the cathode. Current is passed between anode and cathode, desirably up to 50 amperes per square foot of anode area and even higher if a high temperature is maintained in the bath. An alternating current source and a rectifier may conveniently be used to supply approximately 5 to 10 volts necessary for this process, although any convenient D.C. source may be used. If a tightly adherent layer of the acetate process lead dioxide depolarizer is desired, it is important to plate on base stock on which an adherent lead dioxide layer has been deposited from a conventional lead nitrate bath.

A thermal treatment preferably consisting of packing the partially dried plated stock in such a manner that the gaseous reaction products, principally acetic acid and water vapor, are confined to the vicinity of the lead compound, and heating the confined lead compound to 110° C. converts the lead compound to the active allotrope of the invention. This conversion may be performed by other methods provided the original lead compound is plated from the acetate bath as described, but lead dioxide plated from other solutions is not capable of conversion to the allotrope of the invention by any known means.

The preferred concentrations of bath components are 280 gms./liter lead acetate, 100 gms./liter sodium nitrate in distilled or de-ionized, chloride-free water. The preferred temperature is about 30° C., and the preferred current density is about 35 amps./sq. ft. The preferred pH is maintained in the range of about 5 to 5.6, and is adjusted by the addition of compensating quantities of litharge when the plating depletes the lead from the plating solution.

It is believed that the acetate bath lead dioxide so produced is a separate allotropic form of lead dioxide. The evidence for this belief is that the X-ray diffraction pattern shows rhomobhedral symmetry, whereas the nitrate form is tetragonal. Further, the color of deposit is different in that the acetate-derived material is dense black, whereas the lead dioxide derived from the nitrate bath is dull grey. Electron micrographs of conventional beta lead dioxide and of the subject form show a clear distinction between the two forms of the oxide. The conventional oxide shows large crystals, and the novel allotrope appears almost like snow.

To compare the performance of the depolarizer of the invention, identical cells were assembled employing fluoboric acid in conjunction with (a) lead dioxide prepared conventionally from aqueous lead nitrate, and (b) lead dioxide prepared in accord with the present invention. Both cells were operated at temperatures ranging from −70° F. to 160° F. As shown in the table below, the voltage of cell "b," which used the novel depolarizer of the invention, exceeded that of cell "a" using conventional lead dioxide, and maintained lower voltage loss at low temperatures.

| Temp., ° F. | Cell "a" | Cell "b" |
|---|---|---|
| 160 | 1.79 | 1.89 |
| 130 | 1.76 | 1.89 |
| 75 | 1.74 | 1.84 |
| 10 | | 1.73 |
| 0 | 1.56 | |
| −20 | | 1.65 |
| −40 | 1.37 | 1.58 |
| −47 | 1.30 | |
| −50 | | 1.48 |
| −54 | 1.19 | |
| −60 | | 1.47 |
| −62 | 1.18 | |
| −70 | | 1.35 |

Similar performance to that in the preceding table is also shown by the depolarizer of the invention when used in other electrolyte systems such as perchloric acid, methane sulfonic acid, sulfamic acid and nitric acid. Other electrolytes in which the battery reaction products are soluble in general should show this performance.

A particular advantage of the novel allotrope of the invention is that it readily adheres to a conventional lead dioxide depolarizer layer, and may conveniently be plated thereon. If bulk depolarizer of the active allotrope of the invention is desired, however, the process described for its formation may be carried out without previously preparing an adhering lead dioxide, and the allotropic depolarizer may be easily flaked from the inert cathode on which the depolarizer is deposited.

What is claimed is:

1. As a new composition of matter, an allotrope of lead dioxide exhibiting rhombohedral symmetry under X-ray diffraction examinations, said allotrope being further characterized by improved depolarizing activity, and by a dense black color.

2. A process for producing an allotrope of lead dioxide having improved depolarizing activity, comprising providing a salt bath containing an aqueous solution of lead acetate, providing an anode and an inert cathode in said bath, and passing direct current of about 5 to about 10 volts such as to provide a current density ranging from about 35 to about 50 amperes per square foot of anode area between said anode and cathode while said bath is maintained at a temperature ranging from room temperature to about 80° C. and thermally converting the plated material to dense black rhombohedral snow-like flaked crystals by heating the same in a confined enclosure to a temperature around 110° C.

3. A cathode for an electrical cell comprising a base plate having an adherent layer of tetragonal lead dioxide and an overlay consisting of the dense black rhombohedral allotrope of lead dioxide.

References Cited in the file of this patent

UNITED STATES PATENTS

| 311,007 | Kalischer | Jan. 20, 1885 |
| 2,711,496 | Ruben | June 21, 1955 |

FOREIGN PATENTS

| 283,898 | Great Britain | June 7, 1928 |
| 514,523 | Canada | July 12, 1955 |